(12) United States Patent
Mann

(10) Patent No.: US 7,954,836 B2
(45) Date of Patent: Jun. 7, 2011

(54) TRUCKBED ACCESS APPARATUS

(76) Inventor: James H. Mann, Hyde Park, VT (US)

( * ) Notice: Subject to any disclaimer, the term of this patent is extended or adjusted under 35 U.S.C. 154(b) by 225 days.

(21) Appl. No.: 12/456,499

(22) Filed: Jun. 18, 2009

(65) Prior Publication Data

US 2010/0320713 A1 Dec. 23, 2010

(51) Int. Cl.
*B60R 3/00* (2006.01)
(52) U.S. Cl. ........................ 280/163; 280/166
(58) Field of Classification Search .................. 280/163, 280/164.1, 166
See application file for complete search history.

(56) References Cited

U.S. PATENT DOCUMENTS

| | | | |
|---|---|---|---|
| 6,170,843 B1 * | 1/2001 | Maxwell et al. | 280/166 |
| 6,237,927 B1 * | 5/2001 | Debo | 280/166 |
| 6,474,668 B2 * | 11/2002 | Debo | 280/166 |
| 6,530,588 B1 * | 3/2003 | Varney et al. | 280/166 |
| 6,685,204 B1 * | 2/2004 | Hehr | 280/166 |
| 6,953,181 B2 * | 10/2005 | Vodicka | 248/544 |
| 6,994,362 B2 * | 2/2006 | Foster | 280/163 |
| 7,114,736 B2 * | 10/2006 | Stodola et al. | 280/164.1 |
| 7,168,722 B1 * | 1/2007 | Piotrowski et al. | 280/166 |
| 7,195,262 B2 * | 3/2007 | Chaudoin et al. | 280/166 |
| 7,503,572 B2 * | 3/2009 | Park et al. | 280/163 |
| 7,661,693 B1 * | 2/2010 | Lipski | 280/491.5 |
| 7,766,357 B2 * | 8/2010 | Arvanites | 280/166 |
| 2001/0035625 A1 * | 11/2001 | Debo | 280/166 |
| 2002/0008364 A1 * | 1/2002 | Kahlstorf | 280/515 |
| 2003/0116938 A1 * | 6/2003 | Shields et al. | 280/166 |
| 2004/0160035 A1 * | 8/2004 | Stodola et al. | 280/163 |
| 2004/0217573 A1 * | 11/2004 | Foster | 280/166 |
| 2005/0212249 A1 * | 9/2005 | Lopez | 280/164.1 |
| 2005/0275187 A1 * | 12/2005 | Chaudoin et al. | 280/166 |
| 2008/0067775 A1 * | 3/2008 | DiCarlo et al. | 280/166 |
| 2009/0008896 A1 * | 1/2009 | Phillips | 280/166 |
| 2009/0014978 A1 * | 1/2009 | Shumway | 280/166 |
| 2009/0079157 A1 * | 3/2009 | Fratzke | 280/166 |
| 2009/0243249 A1 * | 10/2009 | Arvanites | 280/166 |
| 2010/0025955 A1 * | 2/2010 | Carr, Jr. | 280/166 |
| 2010/0164196 A1 * | 7/2010 | Collins | 280/166 |
| 2010/0320713 A1 * | 12/2010 | Mann | 280/163 |

\* cited by examiner

*Primary Examiner* — Jeffrey J Restifo
(74) *Attorney, Agent, or Firm* — John J. Welch, Jr., Esq.

(57) ABSTRACT

A truckbed access apparatus consisting of a first hollow support component, a second hollow support component affixable over and about the first support component with a step plate affixed thereto, a first holding pin for holding the first support component to a truck reese hitch unit, a second holding pin for holding the second hollow support component to the first one, a vertically inclined support rod affixed through a hole in the step plate to one side thereof and also to the second hollow support component and with a brace component held to the support rod and also to a threaded hook unit in turn hooked into a hole found in a truck reese hitch unit.

9 Claims, 5 Drawing Sheets

US 7,954,836 B2

TRUCKBED ACCESS APPARATUS

CROSS REFERENCES TO PRIOR OR PARENT APPLICATIONS

Figure 1:
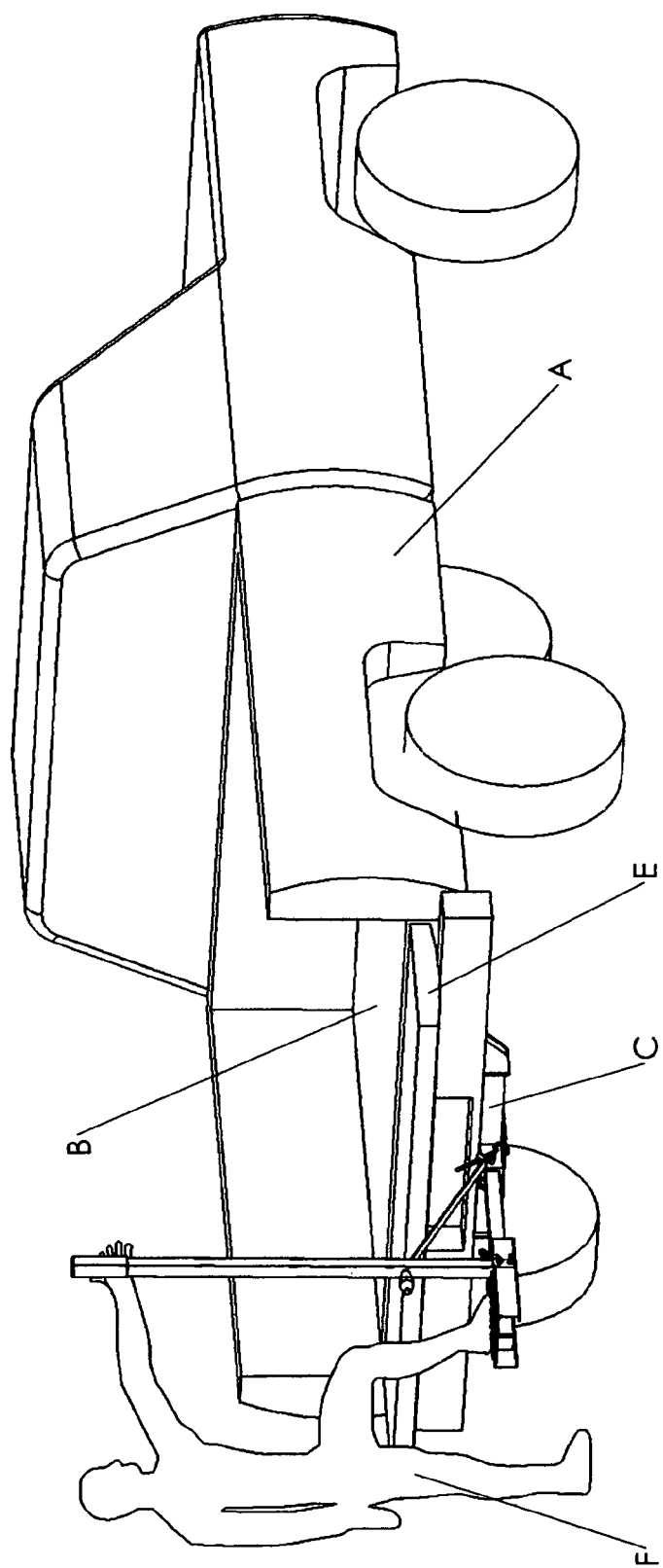

There are no prior or parent applications to which the instant invention relates.

FEDERALLY SPONSORED RESEARCH AND DEVELOPMENT

There is no federally sponsored research or development to which the instant invention relates.

BACKGROUND OF THE INVENTION

1. Field of the Invention

The instant invention relates to devices serving to facilitate access to truckbeds especially on pick-up trucks.

2. Related Art

The herewith submitted Information Disclosure Statement discloses art which relates to but does not anticipate the instant invention.

A SUMMARY OF THE INVENTION

1. A Brief Description of the Invention

The invention is affixable to the back of a pickup truck below the location of the tailgate portion thereof via a first support component hollow in the interior. A first holding pin is insertable through a coaxial pair of laterally positioned through holes in the respective lateral sides of the support component as well as through a pair of corresponding holes in the lateral sides of a reese hitch mounted posteriorly to the pickup truck. The first holding pin is held in place once so inserted by a cotter pin insertable through a hole in one end of the first holding pin. A second hollowed out support component being diagonally slightly larger than the first is positioned over and about the first and held in place by way of a secure holding pin insertable through either one of two holes in the topside of the first hollow support component and a corresponding through hole in the topside of the second hollow support component. A step plate is affixed atop the second support component. A vertically upright support rod is affixable into the support and seating unit portion of the invention that is in turn affixed by screw and nut assemblies to one of the lateral sides of the step plate component of the invention. A reflector plate is affixable into the posterior end of the second support component. An elongated two piece bracing system, affixable via a hook portion thereof to a hole in the reese hitch, serves to hold the support rod rigidly in place during use of the invention.

2. Objects of the Invention

The invention serves to greatly facilitate access to the truckbed portion of a pick-up truck when the tailgate is down. It is especially helpful in this respect for the benefit of elderly, perhaps somewhat arthritic truck owners or small children in need of climbing up onto the truckbed portion of a pickup truck. Also, with resort to utilization of the invention, any risk of weight bearing damage to an open tailgate during the course of any such accessing efforts is wholly obviated. Likewise, the invention makes it possible for one person only instead of two, to load items into the truckbed without the need on the part of one person being alone to first place such an item onto the tailgate or in proximity thereto within the truckbed, then hoist himself or herself onto the tailgate, roll about to gain footing, perhaps getting dirt from the tailgate onto his or her clothing, then after standing up in the truckbed, then, invariably bending down to again pick up the previously positioned item. In such respects, the invention being not only new and unique is unquestionably useful.

A DESCRIPTION OF THE DRAWINGS

1. FIG. 1 shows in perspective view, the first embodiment of the invention mounted to a reese hitch affixed to the back of a pick-up truck bed.

Figure 2:
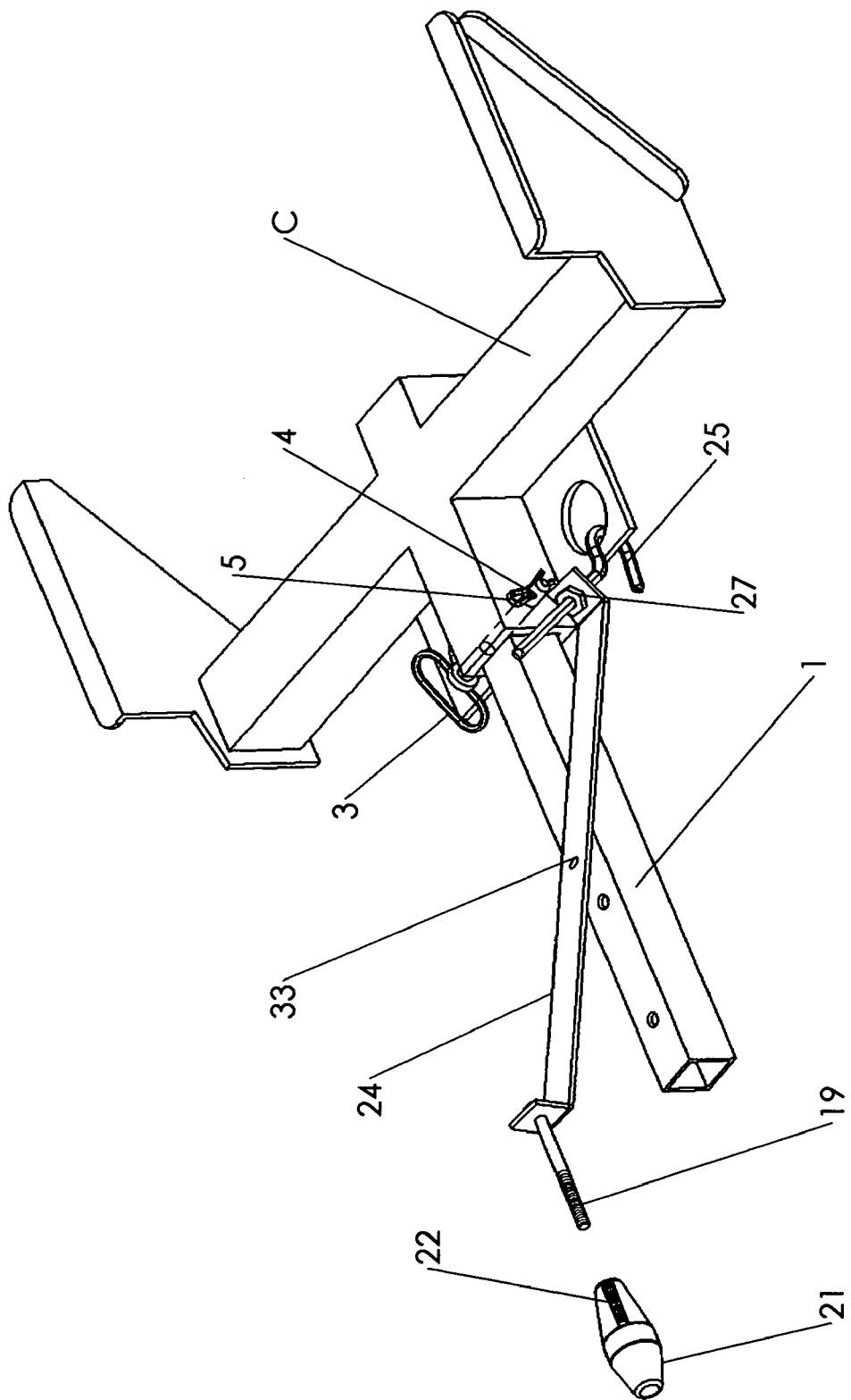

2. FIG. 2 illustrates in isolated perspective view, the manner of affixation of the invention to a reese hitch on a pickup truck.

Figure 3:
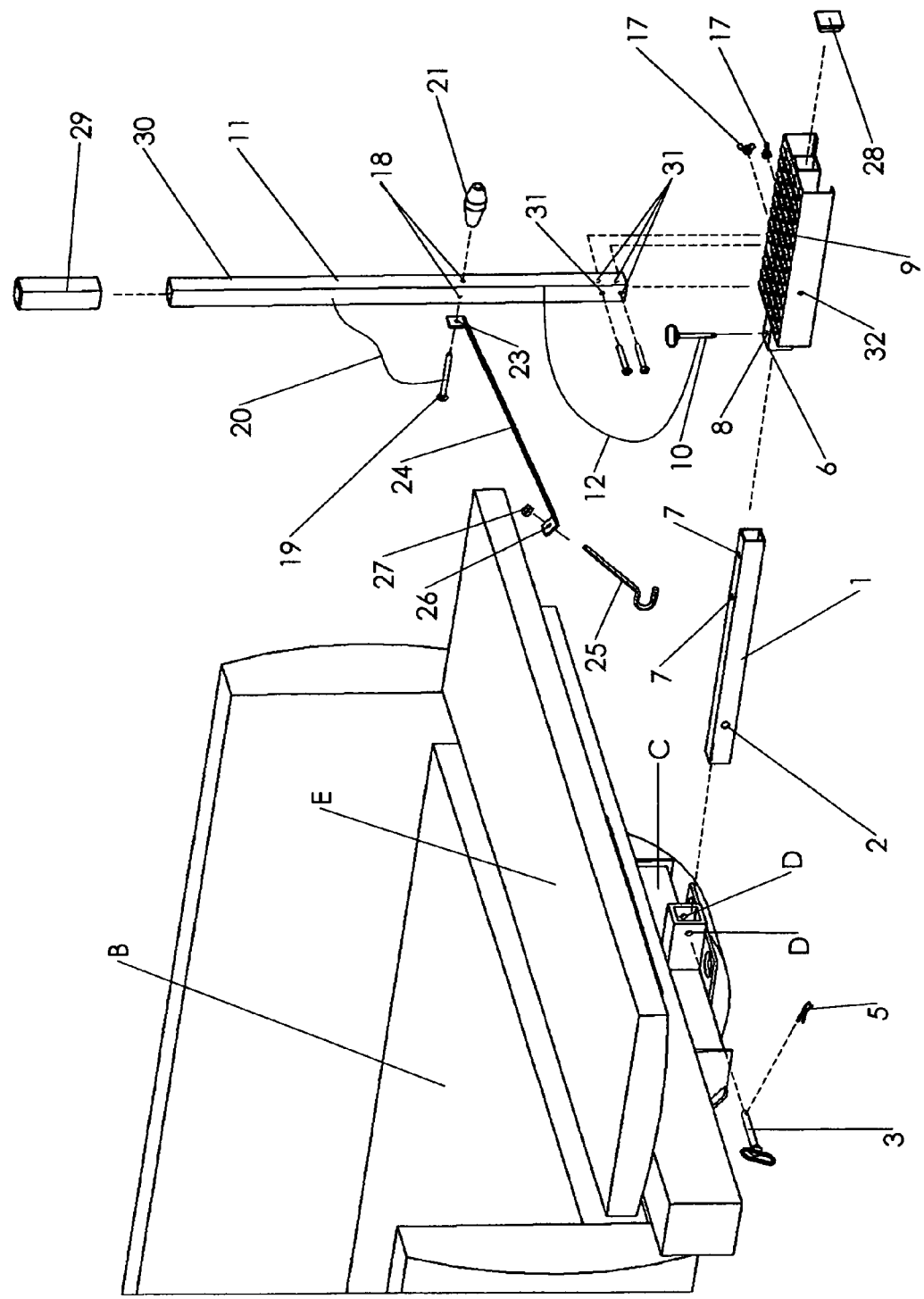

3. FIG. 3 is an exploded view of the first embodiment of the invention illustrating the various components thereof.

Figure 4:
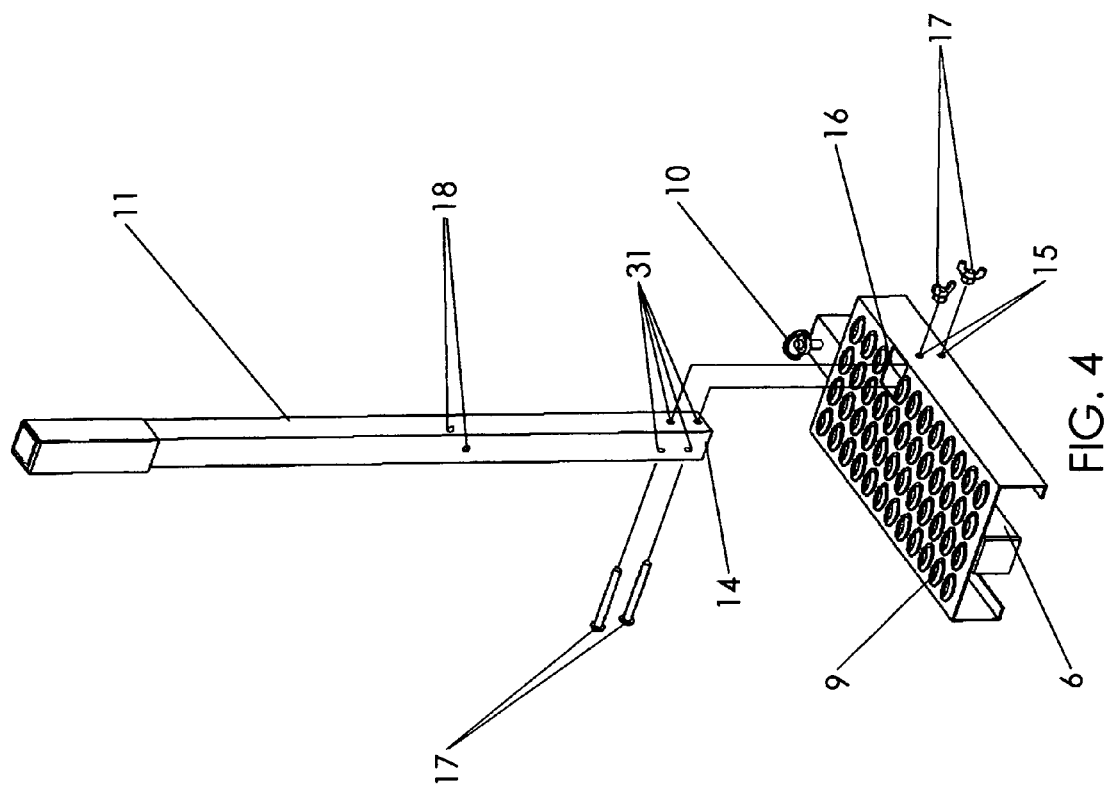

4. FIG. 4 illustrates in isolated perspective view, the manner of affixation of the support rod component of the invention to the step plate component thereof.

Figure 5:
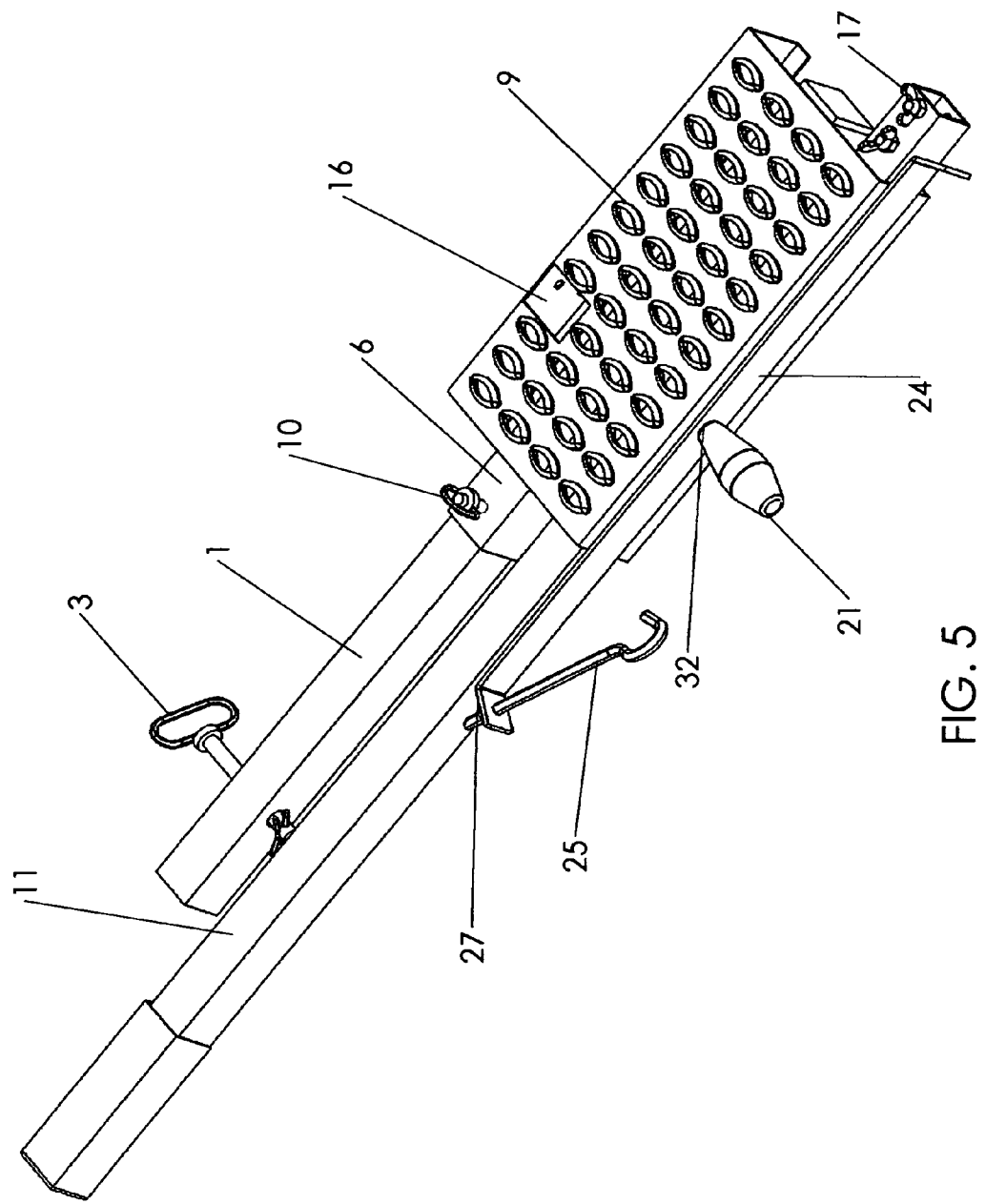

5. FIG. 5 illustrates the storage assembly state of the invention when not in use.

A DESCRIPTION OF THE PREFERRED EMBODIMENTS

FIG. 1 depicts the first embodiment of the invention affixed to a reese hitch component C located and attached to the rear portion of a pickup truck A. FIG. 2 serves to detail the manner of attachment of the invention to such a reese hitch C. The first hollow support component 1 of the invention, characterized by the presence of a coaxial pair of the lateral through holes 2 is held to reese hitch C via insertion of a first holding pin 3 through holes 2 and coaxial through holes D in reese hitch C all as can be seen with resort to FIG. 3. First cotter pin 5 is receivable by end through hole 4 in first holding pin 3 as a means of securing the invention to such a reese hitch C all as can be seen with resort to FIG. 2. FIG. 3, an exploded view of the first embodiment serves to facilitate an appreciation of the essence of the invention with reference to the various parts and features thereof. Second hollow support component 6 is affixable over and about first hollow support component 1 as can be seen with reference to FIG. 3. Either one of first topside through holes 7 in first hollow support component 1 together with second topside through hole 8 in second hollow support component 6 function to receive second holding pin 10 as shown once again with reference to FIG. 3. Second holding pin 10 with detante assembly is insertable through, through hole 8 and either one of through holes 7 depending upon how close to or how far from the open tailgate E attached to the back of a truckbed B of a pickup truck A, one wishes to locate step plate 9 affixed atop second hollow support component 6. Wiring 12 is affixed at one end to pin 10 and at the other end thereof to vertically inclined support rod 11, so as to ensure that pin 10 will not become lost or mislain over time, as the invention is repeatedly assembled to a reese hitch C and then disassembled after use. Hollow support rod 11 is affixed to step plate 9 in the manner depicted in FIG. 4. Lower end 14 of support rod 11 fits snugly into step plate 9. The manner of such assembly contemplates nut and bolt affixation means 17 receivable through lateral holes 15 found in the first one of the two lateral sides of step plate 9 and also through second pairs of coaxial through holes 31 shown in FIG. 3 and found near the lower end of support rod 11; once support rod 11 is inserted through topside hole 16 found in step plate 9. With resort to FIG. 3, one also notes the presence of coaxial support rod through holes 18 within support rod 11. A first pair of coaxial support rod through holes 18 as therein shown serve to receive partially threaded support rod holding bolt 19.

Wiring 20 affixed at one end thereof to support rod 11 and at a second end thereof to bolt 19 functions equivalently with reference to bolt 19 as does wiring 12 with reference to pin 10. Internally hollowed pin knob component 21 with internal threading 22 as shown in FIG. 2 functions in respect of ultimate assembly of the invention to a reese hitch C as shown, for example, in FIGS. 1 and 2, to hold threaded bolt 19 inserted through first brace hole 23 seen in FIG. 3 and also through holes 18 in support rod 11 for the purpose of holding brace component 24 fast to support rod 11 as seen in FIG. 1. Upon assembly of the invention for use as depicted in FIG. 1, partially threaded hook unit 25 is hooked into a hole in reese hitch C as shown in FIG. 2 and is affixed to brace component 24 by way of passing the threaded elongated end of hook unit 25 through second brace hole 26 seen in FIG. 3 and fastening brace component 24 and hook unit 25 together via resort to threading internally threaded nut 27 about the threaded elongated end of hook unit 25 as shown in FIG. 2. The combined brace component 24 and hook unit 25 held fast to the hole in reese hitch C and the through holes 18 of support rod 11 as described above all serve to ensure rigid stability of support rod 11 during use of the invention by a person F seeking to climb up into a truckbed B as shown in FIG. 1. The invention is easily stored when not in use. FIG. 5 illustrates how easily the invention, once disassembled from a reese hitch C when no longer in use, can be compactly pieced together for purposes of ready, easy and convenient storage of the key components thereof all together. Such storage is accomplished as follows: To begin with, nut and bolt means 17 are reassembled fast together through, through holes 31 in support rod 11 once support rod 11 would have first been disassembled from step plate 9. Support rod 11 is then inserted into the under portion of step plate 9 nearly adjacent one side portion thereof after holding bolt 19 would have first been inserted through coaxial support rod through holes 18. Holes 18 are then coaligned with first storage hole 32 in the above mentioned lateral side portion of step plate 9 seen in FIG. 3, or alternatively in the second lateral side thereof so that bolt 19 also then passes through not only the hole 32 but also second storage hole 33 found in brace component 24 once brace component 24 would have been positioned up against the outer walling of the above-mentioned side portion of step plate 9. Then pin knob 21 is threaded onto that segment of bolt 19 extending outwardly through hole 32, and hole 33 thus serving to conveniently hold support rod 11 and brace component 24 fast to step plate 9.

FIG. 1 shows how easily any person F can readily access a truckbed B with resort to utilization of the invention, thereby sparing himself or herself the need to otherwise first sit on the tailgate E thereof, and then roll over to then, thereafter raise himself or herself up to a standing position in the truckbed B. Clearly, the invention, in light of what has just been stated, serves to make it much easier to place packages into a truckbed B. Reflector 28 shown in FIGS. 1 and 3 is notably useful during nighttime drive times for individuals not disposed to ready disassembly of the invention after having utilized it. Hollow cap component 29 shown also in FIGS. 1 and 3 is typically made of a durable rubberized material and fitted over and about the upper end 30 of support rod 11 so as to serve the purposes of persons F disinclined to want to grab onto to an uncapped support rod 11.

For the reasons cited above, respectfully submitted, the invention, as respects the above described embodiments thereof, is, once again, not only new and unique, but, is, likewise, unquestionably useful.

What is claimed is:

1. A truckbed access apparatus, comprising:
 a. a first hollow support component;
 b. a coaxial pair of lateral through holes in said first hollow support component;
 c. a first holding pin being receivable by said coaxial pair of lateral through holes and coaxially positioned through holes in a reese hitch unit affixed to a backend of a pickup truck;
 d. an end through hole in said first holding pin;
 e. a first cotter pin receivable by said end through hole;
 f. a second hollow support component affixable over and about said first hollow support component;
 g. two first topside through holes in said first hollow support component;
 h. a second topside through hole in said second hollow support component;
 i. a step plate affixed atop said second hollow support component;
 j. a second holding pin with detente assembly amenable to receipt by either of said first topside through holes and said second topside through hole;
 k. a vertically inclined support rod;
 l. wiring affixed at one end thereof to said second holding pin and at a second end thereof to said support rod;
 m. lateral holes in a first lateral side of said step plate;
 n. nut and bolt affixation means;
 o. a first pair of coaxial support rod through holes located near a middle portion of said support rod;
 p. a partially threaded support rod holding bolt;
 q. wiring affixed at one end thereof to said support rod and at another end thereof to said holding bolt;
 r. an internally hollowed pin knob component;
 s. internal threading about internal walling within said internally hollowed pin knob component;
 t. a brace component;
 u. a first brace hole located in said brace component;
 v. said holding bolt being receivable through said first brace hole and said first pair of coaxial support rod through holes and said internal threading of said pin knob component as said brace component is thereby anchored to said support rod;
 w. a second brace hole located in said brace component;
 x. an elongated partially threaded hook unit;
 y. an internally threaded nut serving to anchor said brace component to said partially threaded portion of said hook unit upon insertion of said partially threaded portion of said hook unit through said second brace hole;
 z. second pairs of coaxial support rod through holes located near a lower end of said support rod;
 aa. said nut and bolt affixation means being receivable through said lateral holes and said second pairs of coaxial support rod through holes, thereby serving to anchor said support rod to the said step plate once said support rod is inserted through a topside through hole in said step plate, and; once a hooked non-threaded end of said hook unit is hooked into a hole in a reese hitch unit affixed to a backside of a pickup truck;
 bb. a first storage hole located in either said first lateral side of said step plate or a second lateral side thereof, and;
 cc. a second storage hole located in said brace component.

2. The truckbed access apparatus of claim 1 whereby, a reflector unit is affixed into a posterior end portion of said second hollow support component.

3. The truckbed access apparatus of claim 1 whereby, a hollow cap component is affixable over and about an upper end of said support rod.

4. A truckbed access apparatus, comprising:
a. a first hollow support component;
b. a coaxial pair of lateral through holes in said first hollow support component;
c. a first holding pin being receivable by said coaxial pair of lateral through holes and coaxially positioned through holes in a reese hitch unit affixed to a backend of a pickup truck;
d. an end through hole in said first holding pin;
e. a first cotter pin receivable by said end through hole;
f. a second hollow support component affixable over and about said first hollow support component;
g. two first topside through holes in said first hollow support component;
h. a second topside through hole in said second hollow support component;
i. a step plate affixed atop said second hollow support component;
j. a second holding pin with detente assembly amenable to receipt by either of said first topside through holes and said second topside through hole;
k. a vertically inclined support rod;
l. wiring affixed at one end thereof to said second holding pin and at a second end thereof to said support rod;
m. lateral holes in a first lateral side of said step plate;
n. nut and bolt affixation means;
o. a first pair of coaxial support rod through holes located near a middle portion of said support rod;
p. a partially threaded support rod holding bolt;
q. wiring affixed at one end thereof to said support rod and at another end thereof to said holding bolt;
r. an internally hollowed pin knob component;
s. internal threading about internal walling within said internally hollowed pin knob component;
t. a brace component;
u. a first brace hole located in said brace component;
v. said holding bolt being receivable through said first brace hole and said first pair of coaxial support rod through holes and said internal threading of said pin knob component as said brace component is thereby anchored to said support rod;
w. a second brace hole located in said brace component;
x. an elongated partially threaded hook unit;
y. an internally threaded nut serving to anchor said brace component to said partially threaded portion of said hook unit upon insertion of said partially threaded portion of said hook unit through said second brace hole;
z. second pairs of coaxial support rod through holes located near a lower end of said support rod, and;
aa. said nut and bolt affixation means being receivable through said lateral holes and said second pairs of coaxial support rod through holes, thereby serving to anchor said support rod to the said step plate once said support rod is inserted through a topside through hole in said step plate, and; once a hooked non-threaded end of said hook unit is hooked into a hole in a reese hitch unit affixed to a backside of a pickup truck.

5. The truckbed access apparatus of claim 4 whereby, a reflector unit is affixed into a posterior end portion of said second hollow support component.

6. The truckbed access apparatus of claim 4 whereby, a hollow cap component is affixable over and about an upper end of said support rod.

7. A truckbed access apparatus, comprising:
a. a first hollow support component;
b. said first hollow support component being affixed to a reese hitch unit affixed to a backend of a pickup truck;
c. a second hollow support component affixed over and about and to said first hollow support component;
d. a step plate affixed atop said second hollow support component;
e. a vertically inclined support rod affixed through a topside hole in said step plate to a lateral side of said step plate;
f. a brace component being in receipt of a threaded holding bolt through a first brace hole;
g. an internally threaded pin knob component amenable to receipt of said threaded bolt through a pair of coaxial holes in said support rod;
h. a second brace hole amenable to receipt of a threaded portion of a partially threaded hook unit;
i. an internally threaded hut threaded to said threaded portion of said hook unit after said threaded portion is received through said second brace hole, and;
j. a hooked end of said hook unit being affixed to said reese hitch unit.

8. The truckbed access apparatus of claim 7 whereby, a reflector unit is affixed into a posterior end portion of said second hollow support component.

9. The truckbed access apparatus of claim 7 whereby, a hollow cap component is affixable over and about an upper end of said support rod.

* * * * *